(12) United States Patent
Kageyama et al.

(10) Patent No.: US 8,747,761 B2
(45) Date of Patent: Jun. 10, 2014

(54) EXHAUST GAS PURIFICATION DEVICE

(75) Inventors: Yuuta Kageyama, Fujisawa (JP); Isao Ohara, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 65 days.

(21) Appl. No.: 13/699,507

(22) PCT Filed: May 16, 2011

(86) PCT No.: PCT/JP2011/061196
§ 371 (c)(1),
(2), (4) Date: Nov. 21, 2012

(87) PCT Pub. No.: WO2011/148806
PCT Pub. Date: Dec. 1, 2011

(65) Prior Publication Data
US 2013/0064725 A1    Mar. 14, 2013

(30) Foreign Application Priority Data
May 25, 2010   (JP) ................................ 2010-119687

(51) Int. Cl.
*F01N 3/08* (2006.01)
(52) U.S. Cl.
USPC ............................ 422/176; 422/168; 60/299
(58) Field of Classification Search
USPC ....................................................... 422/176
See application file for complete search history.

(56) References Cited

U.S. PATENT DOCUMENTS

2010/0196219 A1 * 8/2010 Endo et al. .................... 422/168

FOREIGN PATENT DOCUMENTS

| JP | 2009-36109 | 2/2009 |
| JP | 2009-228484 | 10/2009 |
| JP | 2010-19082 | 1/2010 |
| WO | WO 2009037795 A1 * | 3/2009 |
| WO | WO 2009/144766 A1 | 12/2009 |

OTHER PUBLICATIONS

International Search Report of Corresponding PCT Application PCT/JP2011/061196 mailed Jul. 19, 2011.
Patent Abstracts of Japan, Publication No. 2009-228484, Published Oct. 8, 2009.
Patent Abstracts of Japan, Publication No. 2010-019082, Published Jan. 28, 2010.
Patent Abstracts of Japan, Publication No. 2009-036109, Published Feb. 19, 2009.
Written Opinion of the International Searching Authority mailed Jul. 19, 2011 in corresponding International Application No. PCT/JP2011/061196.

* cited by examiner

*Primary Examiner* — Walter D Griffin
*Assistant Examiner* — Jelitza Perez
(74) *Attorney, Agent, or Firm* — Staas & Halsey LLP

(57) ABSTRACT

An exhaust gas purification device with a first exhaust pipe section for leading exhaust gas discharged from an engine, a second exhaust pipe section having in a side section on an upstream side thereof an opening section for introducing exhaust gas from the first exhaust pipe section, the second exhaust pipe section being connected at a side section thereof to the first exhaust pipe section so that flow of exhaust gas therein becomes a swirl flow and having provided on a downstream side thereof a post-processing device, and a reduction agent supply device provided at an upstream end of the second exhaust pipe section. The opening section is formed so as to include at least a first tilted side extending in a direction tilted relative to an axis of the second exhaust pipe section.

12 Claims, 4 Drawing Sheets

EXHAUST GAS PURIFICATION DEVICE

CROSS-REFERENCE TO RELATED APPLICATIONS

This application claims the benefit of Japanese Patent Application No. 2010-119687, filed on May 25, 2010, the contents of which is incorporated herein by reference, which serves as priority for PCT Application No. PCT/JP2011/061196, filed May 16, 2011.

TECHNICAL FIELD

The present invention relates to an exhaust gas purification device that includes a post-processing device for reducing and purifying nitrogen compounds contained in exhaust gas discharged from an internal combustion engine, using a reduction agent to be supplied.

BACKGROUND ART

A selective reduction NOx catalyst (hereinafter, SCR) and an occlusion reduction NOx catalyst (hereinafter, LNT), for example, are well known as a post-processing device that reduces and purifies nitrogen compounds (hereinafter, NOx) contained in exhaust gas discharged from a diesel engine (internal combustion engine).

In the SCR, the NOx in the exhaust gas can be reduced and purified by promoting the reductive reaction of the NOx with ammonia ($NH_3$) that is supplied as a reduction agent. In the LNT, the NOx in the exhaust gas is occluded when an air-fuel ratio of the exhaust gas is lean. On the other hand, when the air-fuel ratio is raised by unburned fuel (HC) that is supplied as the reduction agent, the LNT discharges the occluded NOx such that the NOx is reduced and purified by CO, HC, H2, and so on in the exhaust gas.

For the purpose of supplying ammonia or unburned fuel to the post-processing device as the reduction agent, a reduction agent supply means is provided on an exhaust pipe at the upstream side of the post-processing device.

However, space of a vehicle body wherein the exhaust gas purification device being provided is limited. For this reason, a patent document 1, for example, discloses an exhaust gas purification device comprising a first connecting section for turning the direction of the exhaust gas discharged from a diesel particulate filter, a linear section being jointed to the first connecting section in the form of L-shaped and having provided on the upstream end thereof the reduction agent supply means, and a second connecting section being jointed to the linear section in the form of L-shaped and having provided on the downstream end thereof the SCR catalyst device, wherein the reduction agent being injected and mixed with swirl flow in the exhaust pipe so that the reduction agent can efficiently be supplied to the SCR catalyst device.

PRIOR ART DOCUMENTS

Patent Documents

Patent Document 1: Japanese Patent Application Publication No. 2009-36109

In the above mentioned exhaust pipe configuration wherein the first connecting section and the linear section are jointed in the form of L-shaped, an opening section for communicating the first connecting section with the linear section may be formed with a rectangular aperture. In a case where the opening section is formed with the rectangular aperture, a urea solution, which is injected form the reduction agent supply means, may be retained at the peripheral edge of the opening section. As a result, the urea solution being retained at the corner of the opening section, and in a case when the density of the corrosive substance, which is generated during the process of the urea solution being changed to the ammonia, is raised, the peripheral edge of the opening section may be corroded by the retained urea solution.

The present invention has been designed in consideration of these problems, and an object thereof is to provide an exhaust gas purification device uses a simple configuration to prevent a reduction agent, which is injected from a reduction agent supply means, from adhering to and being retained in an exhaust pipe, thereby preventing the inside of the exhaust pipe from being corroded by the retained reduction agent.

Means for Solving the Problem

To achieve the object described above, an exhaust gas purification device according to the present invention includes a post-processing device for reducing and purifying nitrogenous compounds contained in exhaust gas discharged from an internal combustion engine, using a reduction agent, comprising a first exhaust pipe section for leading the exhaust gas discharged from the internal combustion engine, a second exhaust pipe section having in a side section on the upstream side thereof an opening section for introducing the exhaust gas from the first exhaust pipe section, and being connected a side section thereof being to the first exhaust pipe section so that the flow of the exhaust gas therein becomes a swirl flow, and having provided on the downstream side thereof the post-processing device, and a reduction agent supply means provided at the upstream end of the second exhaust pipe section, where in the opening section is formed so as to include at least a first tilted side extending in the direction tilted relative to the axis of the second exhaust pipe section.

Further, the opening section may includes a second tilted side extending from one end of the first tilted side and tilting in the direction relative to the radius of the second exhaust pipe.

Further, a curve section for smoothly continuing the first tilted side with the second tilted side may be provided between the first tilted side and the second tilted side.

Further, the reduction agent supply means may inject urea solution as the reduction agent.

Further, the post-processing device may include a selective reduction NOx catalyst and an oxidation catalyst.

Effect of the Invention

With an exhaust gas purification device according to the present invention, a reduction agent, which is injected from a reduction agent supply means, can be prevented from being retained at the peripheral edge of an opening section provided on an exhaust pipe, and peripheral edge of the opening section can be effectively prevented from being corroded by the retained reduction agent with a simple configuration.

BEST MODES FOR CARRYING OUT THE INVENTION

Figure 1:
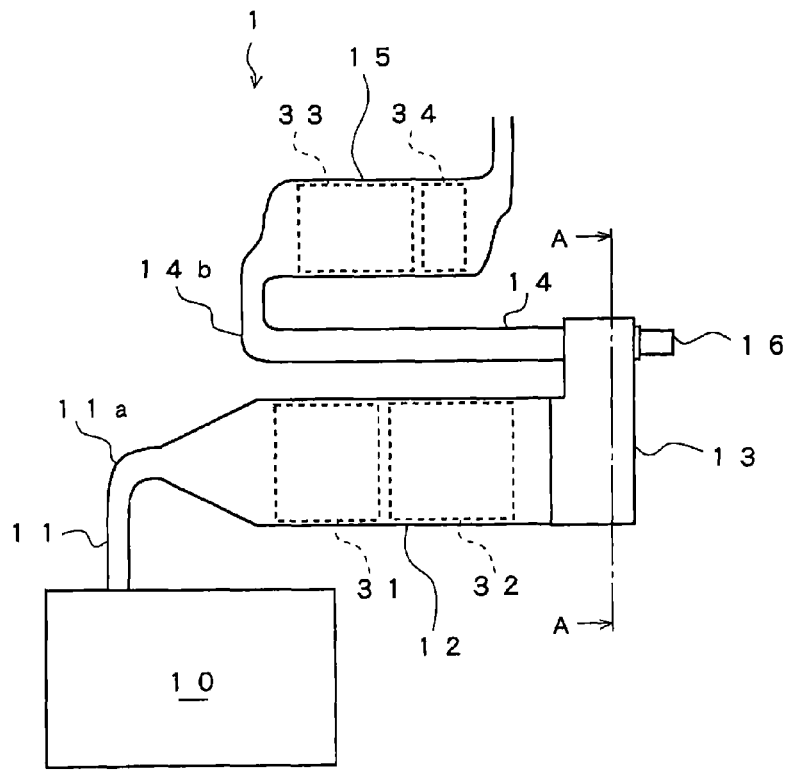
FIG. 1 is a schematic view showing an exhaust gas purification device according to an embodiment of the present invention.

An exhaust gas purification device according to an embodiment of the present invention will be described below with reference to the FIGS. 1 to 5. Identical components have been allocated identical reference numerals and have identical names and functions. Accordingly, detailed description of these components will not be repeated.

As shown in FIG. 1, the exhaust gas purification device 1 includes, in order from the upstream side, an internal combustion engine of a diesel engine (hereinafter, engine) 10, a connection pipe 11 for leading exhaust gas from the engine 10, an upstream post-processing device 12 having provided therein an upstream oxidation catalyst (hereinafter, upstream DOC) 31 and a diesel particulate filter (hereinafter, DPF) 32, a mixing chamber 13 being positioned the longitudinal direction thereof approximately 90 degrees relative to the upstream post-processing device 12, an exhaust pipe (second exhaust pipe) 14 having provided on the upstream end thereof a urea solution injection device (reduction agent supply means) 16, a downstream post-processing device 15 having provided therein a selective reduction NOx catalyst (hereinafter, SCR) 33, and a downstream oxidation catalyst (hereinafter, downstream DOC) 34.

In this embodiment, both the connection pipe 11 and the upstream post-processing device 12 correspond to a first exhaust pipe section of the present invention.

As shown in FIG. 1, the connection pipe 11 being jointed to the upstream side thereof an exhaust manifold (not shown) of the engine 10, and being jointed to the downstream side thereof the upstream post-processing device 12 via a bend section 11a.

The DPF 32, which is provided on the upstream post-processing device 12, traps a particulate matter (hereinafter, PM) in exhaust gas flowing from the connection pipe 11. Further, when the temperature of the upstream DOC 31, which is provided on the upstream side of the DPF 32, is raised by the oxidative reaction due to the fuels supplied from an in-exhaust pipe injection device (not shown) or the post-injection of the engine 10, the DPF 32 burns and removes the deposited PM.

Figure 2:
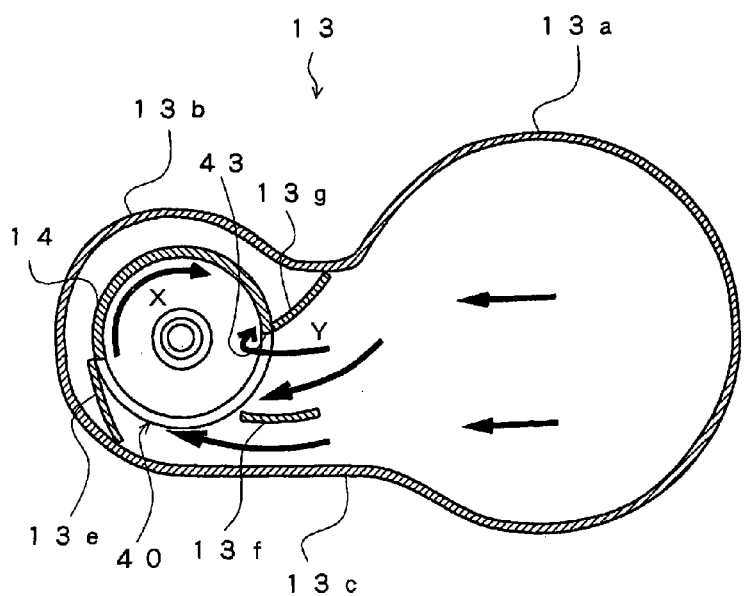
FIG. 2 is a cross-sectional view of A-A line in FIG. 1 showing a main portion of the exhaust gas purification device according to this embodiment of the present invention.

As shown in FIG. 2, the mixing chamber 13 includes an upstream chamber section 13a that is jointed to the downstream side of the upstream post-processing device 12, and a downstream chamber section 13b that is jointed to the exhaust pipe 14. Further, a communicating section 13c, which leads the exhaust gas from the upstream camber section 13a into the downstream chamber section 13b, is provided between the upstream chamber section 13a and the downstream chamber section 13b. In other words, the mixing chamber 13 is integrally formed with the upstream chamber section 13a, the communicating section 13c and the downstream chamber section 13b that are provided in order from the upstream side.

Figure 3:
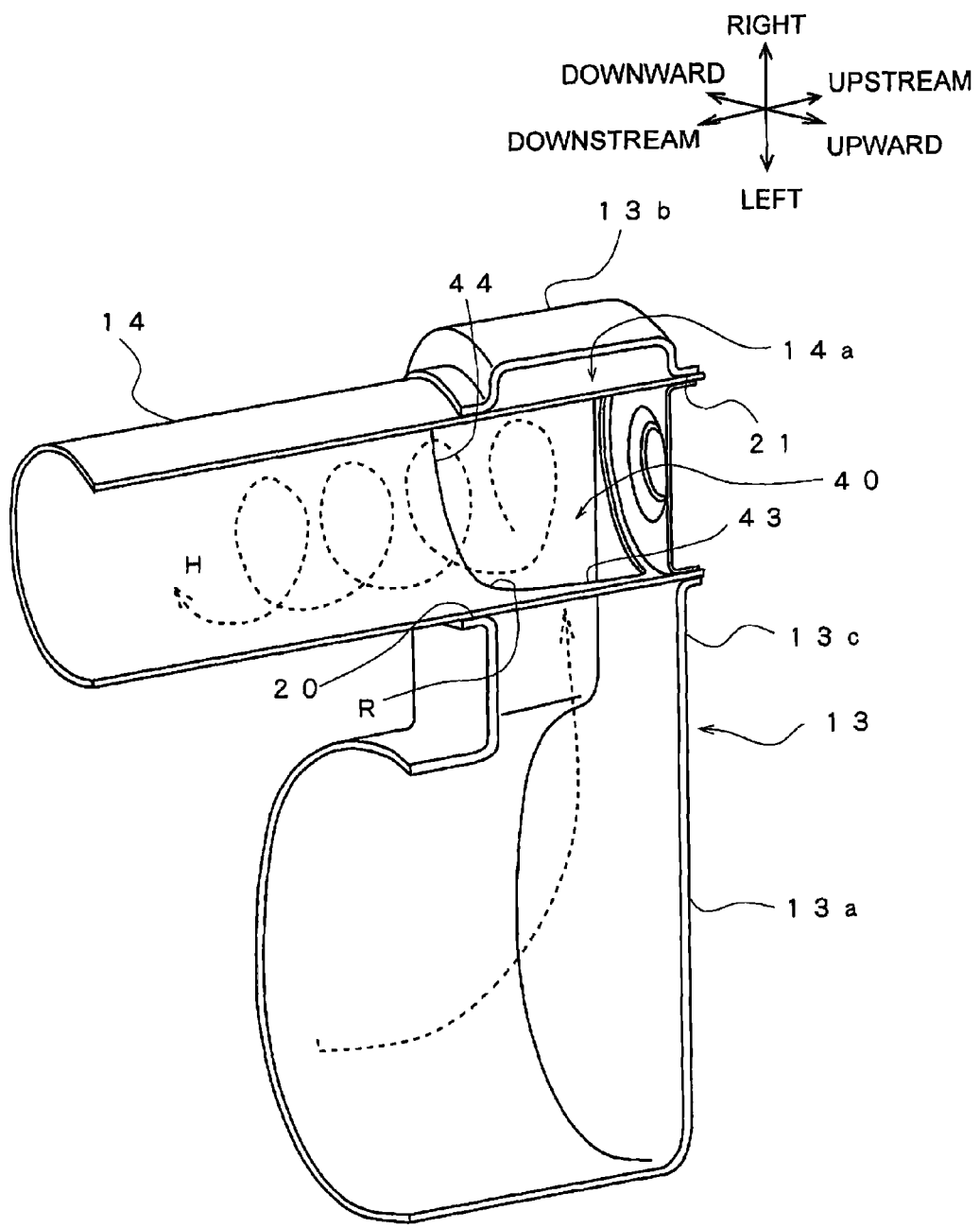
FIG. 3 is a perspective view showing a partial cross section of the exhaust gas purification device according to this embodiment of the present invention.
Figure 4:
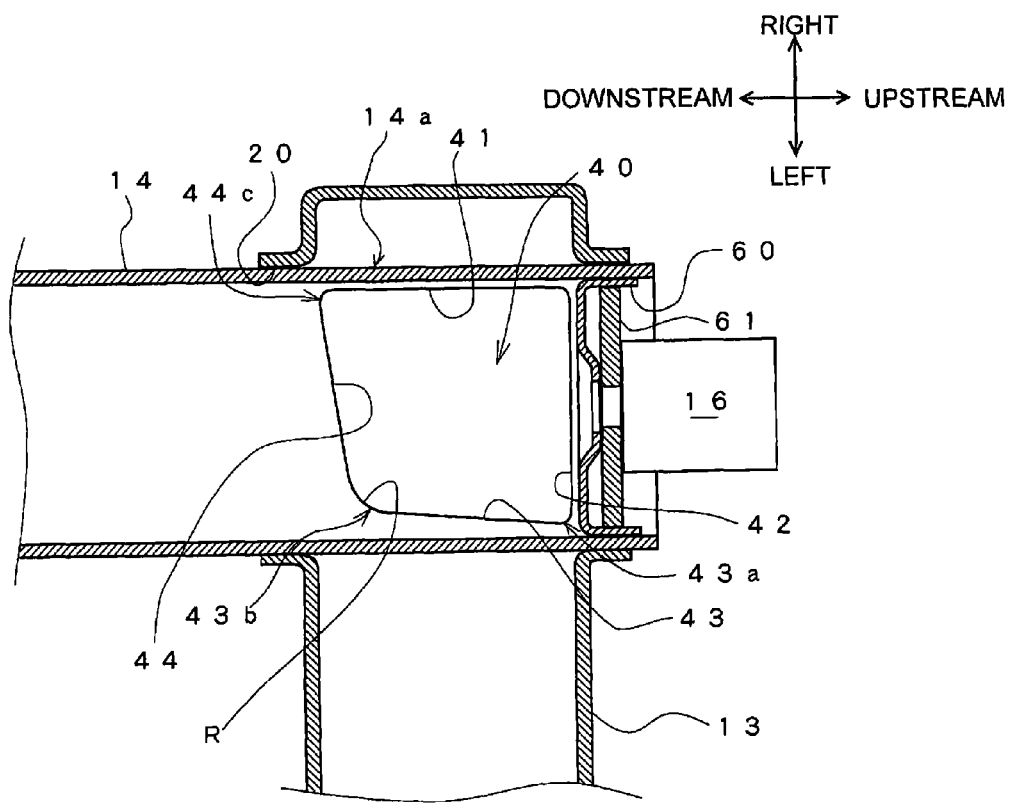
FIG. 4 is a top view showing a partial cross section of the exhaust gas purification device according to this embodiment of the present invention.

As shown in FIGS. 3 and 4, two mounting holes 20, 21 in which an upstream side section 14a of the exhaust pipe 14 being inserted are provided on the wall surface of the downstream chamber section 13b. Further, as shown in FIG. 3, three fins 13e, 13f, 13g, which rectify the flow of the exhaust gas toward an entrance opening 40, are provided on the inside wall surface of the downstream chamber section 13b. These three fins 13e, 13f, 13g introduce the exhaust gas to the entrance opening 40 in the tangential direction of the exhaust pipe 14 so that the flow of the exhaust gas in the exhaust pipe 14 becomes a swirl flow (shown by the arrow X in FIG. 2).

As shown in FIGS. 3 and 4, the exhaust pipe (second exhaust pipe section) 14 is in the form of cylindrical shape. Further, the entrance opening (opening section) 40, which introduces the exhaust gas from the mixing chamber 13, is provided on the upstream side section 14a of the exhaust pipe 14.

Figure 5:
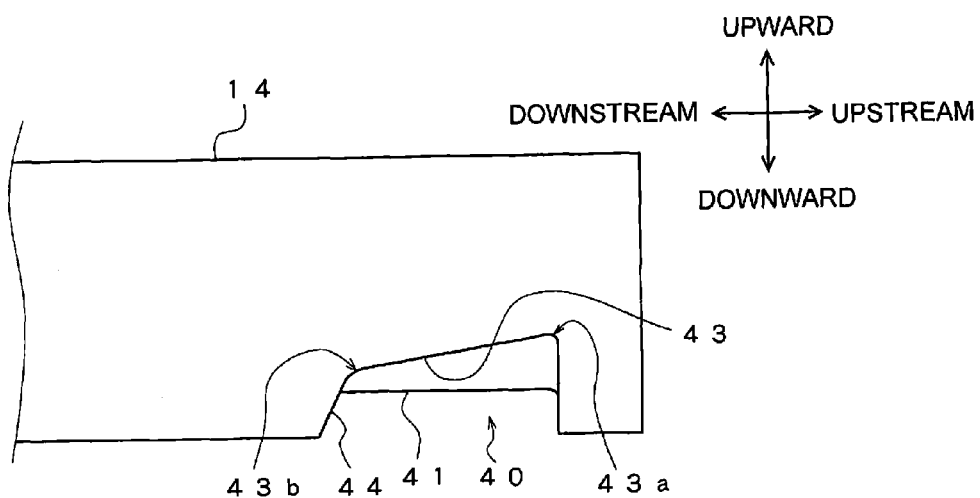
FIG. 5 is a side view showing part of a main section of the exhaust gas purification device according to this embodiment of the present invention.

As shown in FIGS. 4 and 5, the entrance opening 40 is formed with the rectangular aperture by including a right side edge section 41 that is extending in the axial direction of the exhaust pipe 14, an upstream side edge section 42 that is extending in the circumferential direction of the exhaust pipe 14, a left side edge section (first tilted side) 43 that is extending in the axial direction of the exhaust pipe 14, and a downstream side edge section (second tilted side) 44 that is extending in the circumferential direction of the exhaust pipe 14.

As shown in FIG. 5, the left side edge section (first tilted side) 43 is formed with extending in the direction tilted relative to the axis of the exhaust pipe 14. In this embodiment, when viewing the side surface of the exhaust pipe 14 from the upstream side of the mixing chamber 13, the left side edge section 43 is tilted so that an upstream end 43a being positioned above a downstream end 43b.

As shown in FIG. 4, the downstream side edge section (second tilted side) 44 is extending from the one end of the left side edge section 43 in the direction tilted relative to the radius of the exhaust pipe 14. In this embodiment, the downstream side edge section 44 is extending from the downstream end 43b of the left side end section 43 (hereinafter, also referred to as the left end 43b of the downstream side end section 44) toward the right side end section 41, which is relatively opposed to the left side edge section 43. In other words, as shown in FIG. 4, when viewing the entrance opening 40 from the upward, the left end 43b of the downstream side edge section 44 is positioned at the upstream side of the exhaust pipe 14 relative to the right side end 44c.

As shown in FIGS. 3 and 4, a curve section R, which is formed in larger curvature radius than other corners of the entrance opening 40, is provided between the left side edge section 43 and the downstream side edge section 44. As a result of providing the curve section R, the left side edge section 43 and the downstream side edge section 44 are continued smoothly.

As shown in FIG. 3, under the state of directing the entrance opening 40 toward the downward, the upstream side section 14a of the exhaust pipe 14 is inserted into the mounting holes 20, 21 of the mixing chamber 13. In other words, the exhaust pipe 14 is jointed to the downstream chamber section 13b so that the axial direction of the exhaust pipe 14 becomes approximately 90 degrees relative to the longitudinal direction of the mixing chamber 13. On the other hand, as shown in FIG. 1, a downstream post-processing device 15 is jointed to the downstream side of the exhaust pipe 14 via a bend section 14b.

A urea solution injection device (reduction agent supply means) 16 includes a urea solution supply pipe, not shown, a urea solution reverse pipe, a feed pump, a pressure control valve, a storage tank and so on. Further, as shown in FIG. 4, the urea solution injection device 16 is provided on the upstream end of the exhaust pipe 14 by fixing thereon a clamp plate 61 with bolts, and mounting the clamp plate 61 on a thermal isolation plate 60, which is fitted and inserted into the upstream inside of the exhaust pipe 14.

The SCR 30, which is provided on the downstream post-processing device (post-processing device) 15, promotes the reductive reaction of the NOx contained in the exhaust gas flowing from the exhaust pipe 14. More specifically, when the urea solution is injected from the urea solution injection means (not shown), which is provided on the upstream side, the exhaust gas hydrolyzes the injected urea solution, and as a result, ammonia is to be generated. The SCR 30 adsorbs the generated ammonia, and when the exhaust gas passing therein, the NOx is reduced and purified by the adsorbed ammonia.

Further, in a case where the excess ammonia is slipped from the SCR 33, the downstream DOC 34, which is provided on the downstream side of the SCR 33, oxidizes and removes the slipped ammonia from the exhaust gas.

By employing the configuration described above, following actions and effects can be obtained with the exhaust gas purification device 1 according to this embodiment of the present invention.

The exhaust gas, which is discharged from the engine 10, is introduced to the upstream post-processing device 12 via the connection pipe 11. The exhaust gas, which is flowing into the upstream post-processing device 12, is introduced to the mixing chamber 13. During passing the upstream post-processing device 12, the DPF 32 traps PM that is contained in the exhaust gas.

As shown in FIG. 2, the exhaust gas, which is introduced to the upstream chamber section 13a of the mixing chamber 13, flows into the downstream chamber section 13b via the communication section 13c. Further, the exhaust gas is rectified and introduced to the entrance opening 40 by the plurality of the fins 13e, 13f, 13g.

Large portion of the exhaust gas, which is flowing from the entrance opening 40 into the inside of the exhaust pipe 14, is introduced in the tangential direction of the exhaust pipe 14 by the fins 13e, 13f, 13g. The exhaust gas, which is flowing in the tangential direction, is raised by the internal wall surface of the exhaust pipe 14, and as a result, the exhaust gas is swirled and proceeded toward the downstream, as shown by the dashed line H in FIG. 3.

Further, part of the exhaust gas, which is introduced from the entrance opening 40 into the inside of the exhaust pipe 14, reaches to the internal surface of the exhaust pipe 14 adjacent to the left side edge section 43 due to the rolling flow that is passing the fin 13g, as shown by the arrow Y in FIG. 2.

The urea solution, which is injected from the urea solution injection device 16, is being mixed with air and diffused by the swirl flow (shown by the arrow X in FIG. 2), but part of the urea solution adheres on the inside surface of the exhaust pipe 14 and flows toward the position adjacent to the left side edge section 43 with the swirl flow (shown by the arrow X in FIG. 2). As a result, the urea solution, which is reached at the position adjacent to the left side edge section 43, is being retained at the position adjacent to the left side edge section 43 by the rolling flow (shown by the arrow Y in FIG. 2).

The urea solution adheres on the internal surface of the exhaust pipe 14 adjacent to the left side end section 43 and flows to the curve section R along the left side edge section 43, which is tilted by positioning the upstream end 43a below the downstream end 43b. And then, the urea solution reaches at the curve section R and flows to the downstream side edge section 44, which is smoothly continued by the curve section R. As a result, the urea solution further flows from the right side end 44c of the downstream side edge section 44 toward the downstream.

Therefore, the urea solution, which is injected from the urea solution injection device 16, can be prevented from being retained at the left side edge section 43 or the downstream side edge section 44 (peripheral edge of the entrance opening 40) provided on the exhaust pipe 14, and the peripheral edge of the entrance opening 40 can be prevented from being corroded by the retained urea solution. In particular, by providing the curve section R between the left side edge section 43 and the downstream side edge section 44, the urea solution can be effectively prevented from being retained at the corners of the entrance opening 40.

Further, during the process of flowing the urea solution, which is adhered on the internal surface of the exhaust pipe 14 adjacent to the left side edge section 43, toward the downstream via the left side edge section 43, the curve section R and the downstream side edge section 44, large section of the urea solution can be hydrolyzed by the exhaust gas, and can be generated to the ammonia that is being supplied to the SCR 33.

Note that the present invention is not limited to the embodiment described above and may be amended appropriately within a scope that does not depart from the spirit of the present invention.

For example, the exhaust pipe 14 is explained being formed with the cylindrical shape. However, the exhaust pipe 10 does not necessary have to be formed in the cylindrical shape, and a rectangular cross section pipe and the like can be also used.

Further, in the above embodiment, the downstream post-processing device 15 is explained to includes the SCR 33, but an occlusion reduction NOx catalyst (LNT catalyst) can be provided in place of the SCR 33. In case of LNT, an in-exhaust pipe injection device that is supplying fuel (HC) can be used in place of the urea solution injection device 16.

Figure 6:
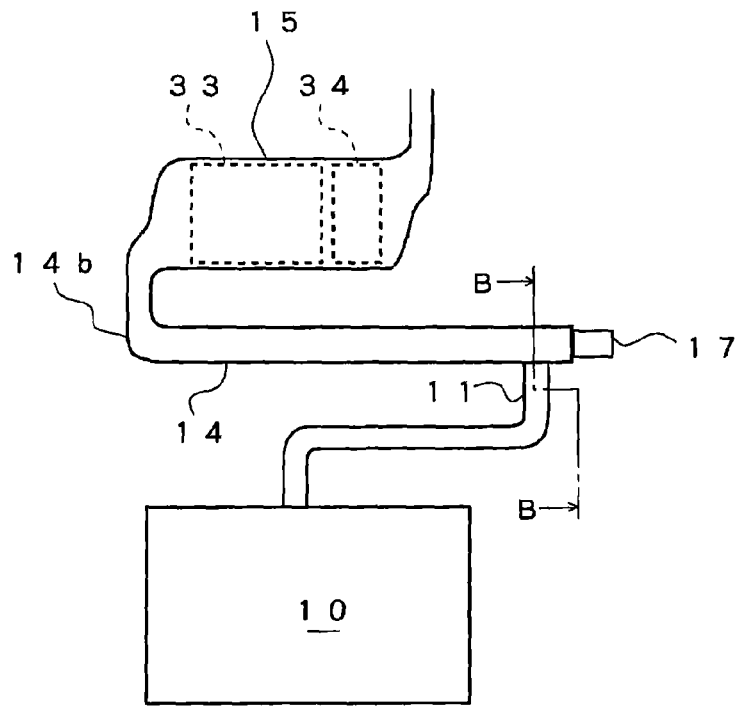
FIG. 6 is a schematic view showing an exhaust gas purification device according to the other embodiment.
Figure 7:
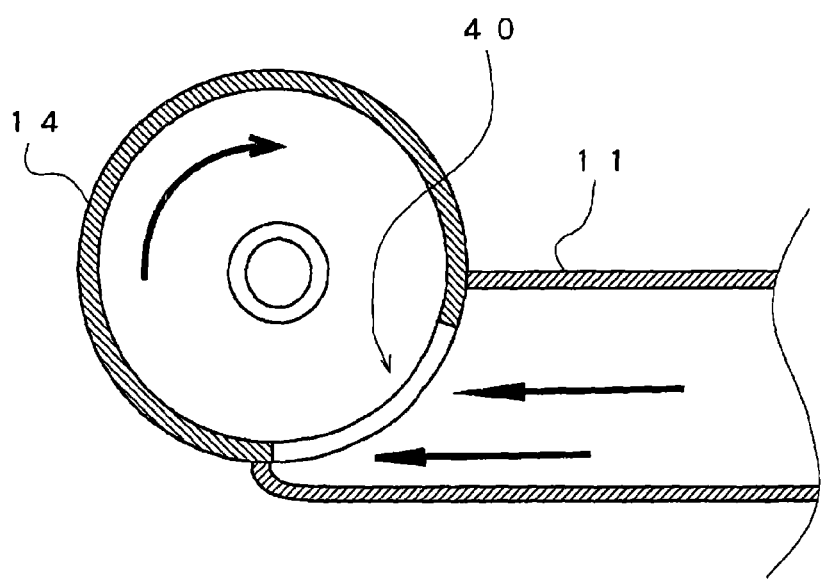
FIG. 7 is a cross-sectional view of B-B line in FIG. 6 showing part of a main section of the exhaust gas purification device according to the other embodiment.

Further, as shown in FIGS. 6 and 7, the upstream post-processing device 12 does not necessary have to be provided, and both the upstream post-processing device 12 and the mixing chamber 13 can be eliminated by directly jointing the exhaust manifold (not shown) of the engine 10 to the exhaust pipe 14 with the connection pipe 11. In this case, the same actions and effects of the above embodiment can be obtained.

EXPLANATION OF REFERENCE NUMERALS 1 exhaust gas purification device
10 engine (internal combustion engine)
11 connection pipe (first exhaust pipe portion)
12 upstream post-processing device (first exhaust pipe portion)
13 mixing chamber (first exhaust pipe portion)
14 exhaust pipe (second exhaust pipe portion)
15 downstream post-processing device
16 urea solution injection device (reduction agent supply means)
43 left side edge section (first tilted side)
44 downstream side edge section (second tilted side)
R curve section

The invention claimed is:
1. An exhaust gas purification device includes a post-processing device for reducing and purifying nitrogenous com- pounds contained in exhaust gas discharged from an internal combustion engine, using a reduction agent, comprising:

a first exhaust pipe section for leading the exhaust gas discharged from the internal combustion engine;

a second exhaust pipe section having in a side section on the upstream side thereof an opening section for introducing the exhaust gas from the first exhaust pipe section, and being connected a side section thereof being to the first exhaust pipe section so that the flow of the exhaust gas therein becomes a swirl flow, and having provided on the downstream side thereof the post-processing device; and a reduction agent supply means provided at the upstream end of the second exhaust pipe section, wherein the opening section is formed so as to include at least a first tilted side extending in the direction tilted relative to the axis of the second exhaust pipe section.

2. The exhaust gas purification device according to claim 1, wherein the opening section further includes a second tilted side extending from one end of the first tilted side and tilting in the direction relative to the radius of the second exhaust pipe.

3. The exhaust gas purification device according to claim 2, wherein a curve section for smoothly continuing the first tilted side with the second tilted side is provided between the first tilted side and the second tilted side.

4. The exhaust gas purification device according to claim 1, wherein the reduction agent supply means injects urea solution as the reduction agent.

5. The exhaust gas purification device according to claim 2, wherein the reduction agent supply means injects urea solution as the reduction agent.

6. The exhaust gas purification device according to claim 3, wherein the reduction agent supply means injects urea solution as the reduction agent.

7. The exhaust gas purification device according to claim 1, wherein the post-processing device includes a selective reduction NOx catalyst and an oxidation catalyst.

8. The exhaust gas purification device according to claim 2, wherein the post-processing device includes a selective reduction NOx catalyst and an oxidation catalyst.

9. The exhaust gas purification device according to claim 3, wherein the post-processing device includes a selective reduction NOx catalyst and an oxidation catalyst.

10. The exhaust gas purification device according to claim 4, wherein the post-processing device includes a selective reduction NOx catalyst and an oxidation catalyst.

11. The exhaust gas purification device according to claim 5, wherein the post-processing device includes a selective reduction NOx catalyst and an oxidation catalyst.

12. The exhaust gas purification device according to claim 6, wherein the post-processing device includes a selective reduction NOx catalyst and an oxidation catalyst.

* * * * *

UNITED STATES PATENT AND TRADEMARK OFFICE
CERTIFICATE OF CORRECTION

| | |
|---|---|
| PATENT NO. | : 8,747,761 B2 |
| APPLICATION NO. | : 13/699507 |
| DATED | : June 10, 2014 |
| INVENTOR(S) | : Kageyama et al. |

It is certified that error appears in the above-identified patent and that said Letters Patent is hereby corrected as shown below:

On the Title Page Item [73] (Assignee), Line 1, below "Isuzu Motors Limited, Tokyo (JP)", insert -- Hino Motors, Ltd., Tokyo (JP) --.

Signed and Sealed this
Ninth Day of June, 2015

Michelle K. Lee
*Director of the United States Patent and Trademark Office*